US012769815B2

(12) United States Patent
Deboyser et al.

(10) Patent No.: US 12,769,815 B2
(45) Date of Patent: Oct. 20, 2026

(54) AUTHENTICATION HARDWARE TOKEN ENSURING CONTROL OF USER DATA

(71) Applicant: NXP B.V., Eindhoven (NL)

(72) Inventors: Fabien Jacques Deboyser, Gratentour (FR); Jonathan Azoulai, Cannes (FR); Nori Hamza Zerigat, Saint Jeannet (FR); Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 64 days.

(21) Appl. No.: 18/952,351

(22) Filed: Nov. 19, 2024

(65) Prior Publication Data

US 2025/0190532 A1 Jun. 12, 2025

(30) Foreign Application Priority Data

Dec. 11, 2023 (EP) .................................... 23307175

(51) Int. Cl.
*G06F 21/32* (2013.01)
*G06F 21/33* (2013.01)

(52) U.S. Cl.
CPC .............. *G06F 21/32* (2013.01); *G06F 21/33* (2013.01)

(58) Field of Classification Search
CPC ................................ G06F 21/32; G06F 21/33
USPC ......................................................... 713/186
See application file for complete search history.

(56) References Cited

U.S. PATENT DOCUMENTS

| | | | | |
|---|---|---|---|---|
| 4,926,479 | A | 5/1990 | Goldwasser et al. | |
| 7,363,492 | B2 | 4/2008 | Kuhlman et al. | |
| 8,250,387 | B2 | 8/2012 | Tsukamoto et al. | |
| 9,124,582 | B2 | 9/2015 | Kalinichenko et al. | |
| 9,319,393 | B2 | 4/2016 | Hillis | |
| 9,647,999 | B2 | 5/2017 | Grigg et al. | |
| 9,807,076 | B2 | 10/2017 | Raman et al. | |
| 10,164,963 | B2 | 12/2018 | Ponsini et al. | |
| 10,417,532 | B2 | 9/2019 | Liang et al. | |
| 10,764,273 | B2 | 9/2020 | Abdul et al. | |
| 11,017,377 | B2 | 5/2021 | Leung | |
| 11,502,843 | B2 | 11/2022 | Schat | |
| 11,507,648 | B2 | 11/2022 | Kim et al. | |
| 11,558,365 | B1 | 1/2023 | McCorkendale | |
| 2014/0062658 | A1 | 3/2014 | Vrijen et al. | |
| 2019/0253414 | A1* | 8/2019 | Giobbi | H04L 63/0853 |
| 2020/0000345 | A1* | 1/2020 | Connor | A61B 5/14532 |
| 2020/0027091 | A1* | 1/2020 | Hassani | H04L 63/0807 |
| 2020/0159896 | A1 | 5/2020 | Shapiro et al. | |
| 2021/0256102 | A1 | 8/2021 | Luft | |
| 2021/0295345 | A1 | 9/2021 | Varia | |
| 2024/0223555 | A1* | 7/2024 | Fukushima | G06F 21/31 |
| 2025/0170988 | A1* | 5/2025 | Asai | B60R 25/01 |

* cited by examiner

*Primary Examiner* — Michael S McNally

(57) ABSTRACT

A method of accessing secure data on a user device, wherein authentication access of the user device is not available, including: receiving a request from a requester to access secure data in the user device; receiving authentication input from a user; authenticating a data input from the user using a control token; and providing access to secure data to the requester.

18 Claims, 3 Drawing Sheets

AUTHENTICATION HARDWARE TOKEN ENSURING CONTROL OF USER DATA

CROSS-REFERENCE TO RELATED APPLICATIONS

This application claims the priority under 35 U.S.C. § 119 of European Patent application no. 23307175.2, filed on Dec. 11, 2023, the contents of which are incorporated by reference herein.

FIELD OF THE DISCLOSURE

Various exemplary embodiments disclosed herein relate to authentication hardware token ensuring control of user data by the data owner.

BACKGROUND

Authentication hardware tokens may be used to ensure control of user data by the data owner. The data owner is in possession of their hardware token (e.g., a keyring, a key fob, a bracelet, a health device, smartwatch, etc.) that contains certified authentication data used to validate access to a service. For example, to get access to the digital identity service offered by the European Digital Identity wallet (EUDIW) running on their smartphone, the data owner will present their hardware token (something you have), and in combination with their authentication (something you know or something you are), that will allow the transaction by a cryptographic means and records the transaction. This allows the user to keep control over the data shared.

SUMMARY

A summary of various exemplary embodiments is presented below.

Various embodiments relate to a method of accessing secure data on a user device, wherein authentication access of the user device is not available, including: receiving a request from a requester to access secure data in the user device; receiving authentication input from a user; authenticating a data input from the user using a control token; and providing access to secure data to the requester.

Various embodiments are described, wherein the authentication input from the user includes a biometric input.

Various embodiments are described, wherein the authentication input from the user also includes a secret user input code.

Various embodiments are described, wherein authenticating the data input from the user using a control token uses near field communication.

Various embodiments are described, wherein authenticating the data input from the user using a control token uses one of ultra-wideband communication, Bluetooth communication, and near field magnetic induction communication.

Various embodiments are described, wherein providing access to secure data to the requester includes securely sending the requested secure data to the requester.

Various embodiments are described, further including: receiving a request from the user to add the control token as an authentication device; and binding the control token to the user device.

Further various embodiments relate to a method of accessing secure data on a user device by a requester device, wherein the user device is in a low power mode, including: sending a request to the user device to access secure data in the user device; receiving data from the user device including biometric verification data; receiving a biometric input from a verifier device, where a user provides a biometric input to the verifier device; comparing the biometric input from the verifier device with the biometric verification data; and accessing the secure data of the user when an input from the verifier device matches the biometric verification data.

Various embodiments are described, wherein the user also provides a secret user input code input to the verifier device.

Various embodiments are described, wherein sending a request to the user device uses near field communication.

Various embodiments are described, wherein sending a request to the user device uses one of ultra-wideband communication, Bluetooth communication, and near field magnetic induction communication.

Various embodiments are described, wherein receiving data from the user device accessing the secure data includes: receiving data from the user device includes receiving encrypted secure data from the user device; and accessing the secure data includes decrypting the encrypted secure data when an input from the verifier device matches the biometric verification data.

Various embodiments are described, further including: sending proof to the user device that the user performed a biometric verification; and receiving encrypted secure data from the user device when the user device verifies the proof that the user performed a biometric verification.

Further various embodiments relate to a method of accessing secure data on a user device by a requester device, wherein the user device is in a low power mode, including: receiving a request from the requester device to access secure data in the user device; sending data to the requester device including biometric verification data; receiving proof of a biometric input from into a verifier device from the requester device, where the user provides a biometric input to the verifier device; verifying the proof of a biometric input; and sending the secure data of the user to the requester device when the proof of a biometric input is verified.

Various embodiments are described, wherein proof of a biometric input from into a verifier device includes proof that the user input a secret user input code to the verifier device.

Various embodiments are described, wherein receiving the request from the requester device uses near field communication.

Various embodiments are described, wherein receiving the request from the requester device uses one of ultra-wideband communication, Bluetooth communication, and near field magnetic induction communication.

Various embodiments are described, further including encrypting the secure data before sending the secure data to the requester device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
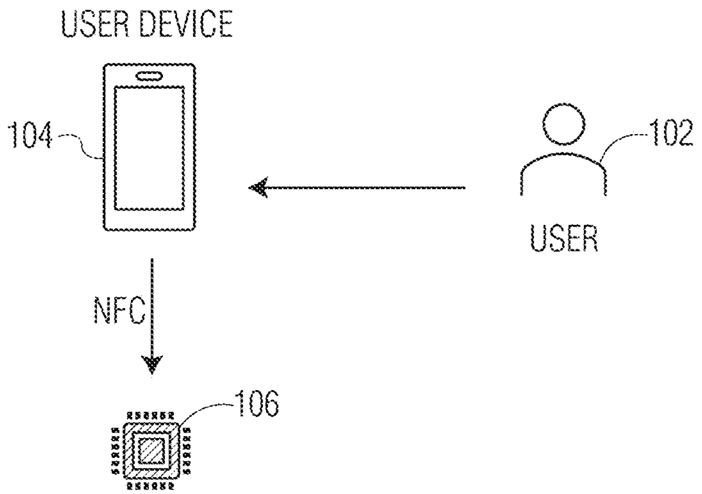
FIG. 1 illustrates an enrollment process.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of authentication system will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Authentication hardware tokens may be used to ensure control of user data by the data owner. The data owner is in possession of their hardware token (e.g., a keyring, a key fob, a bracelet, a health device, body implant, smartwatch, etc.) that contains certified authentication data used to validate access to a service. For example, to get access to the digital identity service offered by the European Digital Identity wallet (EUDIW) running on their smartphone, the data owner will present their hardware token (something you have), and in combination with their authentication (something you know or something you are), that will allow the transaction by a cryptographic means and records the transaction. This allows the user to keep control over the data shared. Presenting the hardware token may only require proximity of the hardware token to a reader in addition to requiring user input to allow the hardware token to be used.

In the context of digital wallets, such as for example the EUDIW, access to the services can result in exposure of some sensitive data owned by a user. This is true for example when the user's device with the sensitive data is offline or has a low battery. Because an authentication may typically require some sort of network connection, the user is not able to perform the authentication when a network connection is not possible.

The embodiments disclosed herein bring additional trust to the ecosystem of a digital identity service, particularly when the owner's smartphone is offline or low battery, and a trust relationship shall take place and the device owned by the user is not able to perform a fully functional authentication required to establish the trust in the authorization for the access to the sensitive data. For example, if the device has a low battery, the device cannot perform a facial or other biometric recognition any more or it cannot drive the touch screen anymore.

An authentication system will be described herein that allows the securing of data owned by the user to safely use a digital identity service leveraging a local hardware token or control token owned by the data owner. The control token is required to contribute to the authentication of the user, which can be performed with ultra-wideband (UWB), near-field communication (NFC), near field magnetic induction (NFMI), or other communication protocols. The token may always be mandatory, and when the user device is fully functional, the token is used as a second factor authentication. The token may be mandatory only when the user device is not fully functional and optional otherwise: i.e., the token is used as a replacement for other authentication means of the user device. Additional data stored on the hardware token complement the trust in the system. When the user device is fully functional and the token is used in addition, the token can store additional information indicating a recent authorization on the user device that can be reused when the token is used as a replacement for some of the trust relationship establishment when the user device is not fully functional. Note that the description of the embodiments refers systematically to the EUDIW, but it can equally be used for any similar service (e.g., a national digital identity service, an access control system, Apple wallet, Google wallet, etc.) It is noted that any given control token may be used to assist in authenticating a variety of devices. Further, the user may have multiple control tokens, and the authentication process may require the use of more than one control token in order to increase the security of the authentication system and process.

The trust system has four entities: a user; a local device; a control token; and a local requester. The user owns the local or user device where sensitive data are stored. The local device belongs to the user. Storage of data in the local device may be on a secure element. The user device may be battery powered and may enter a low battery state limiting the functionality of the user device. The user device may include radio connectivity (e.g., USB, NFC, Bluetooth (BT), etc.) that may not be functional when authentication is needed. The control token stores authentication data and stores logs used by the user to authenticate to the EUDIW. The local requester (e.g., policeman, administration, transport employee, etc.) requests access to the data of the data owner stored on the device's secure element. The verifier may be online and may have access to a network.

FIG. 1 illustrates an enrollment process of an authentication system. A user 102 makes a request to add a control token as a two factor authentication for their EUDIW. Then a control token 106 is presented by the user to the user device 104. The control token 106 may interact with the user device 104 using NFC, UWB, Bluetooth, NFMI, etc. The user device 104 personalizes the control token 106 and makes a binding between the user device 104 and the control token 106. The user device now requires the use of the control token 106 for each authentication (two factor authentication by default). In other embodiments, more than one token may be enrolled for use, and the system may use one or more of the tokens for authentication purposes.

It is noted that there a special category of devices that could potentially be used by the authentication system embodiments described herein include medical implants on or in the body of the user 102. The medical implants may include, e.g., continuous glucometer, heart pacemaker, insulin pumps, hearing aids, cochlear implants, etc.

When the user device 104 is fully operational, the control token 106 is an optional second factor authentication, but when the user device 104 is not fully operational, the control token 106 will be the authentication factor. NFC is mentioned in FIG. 1, but any communication technology between the User device 104 and the control token 106 may be used as well.

Figure 2:
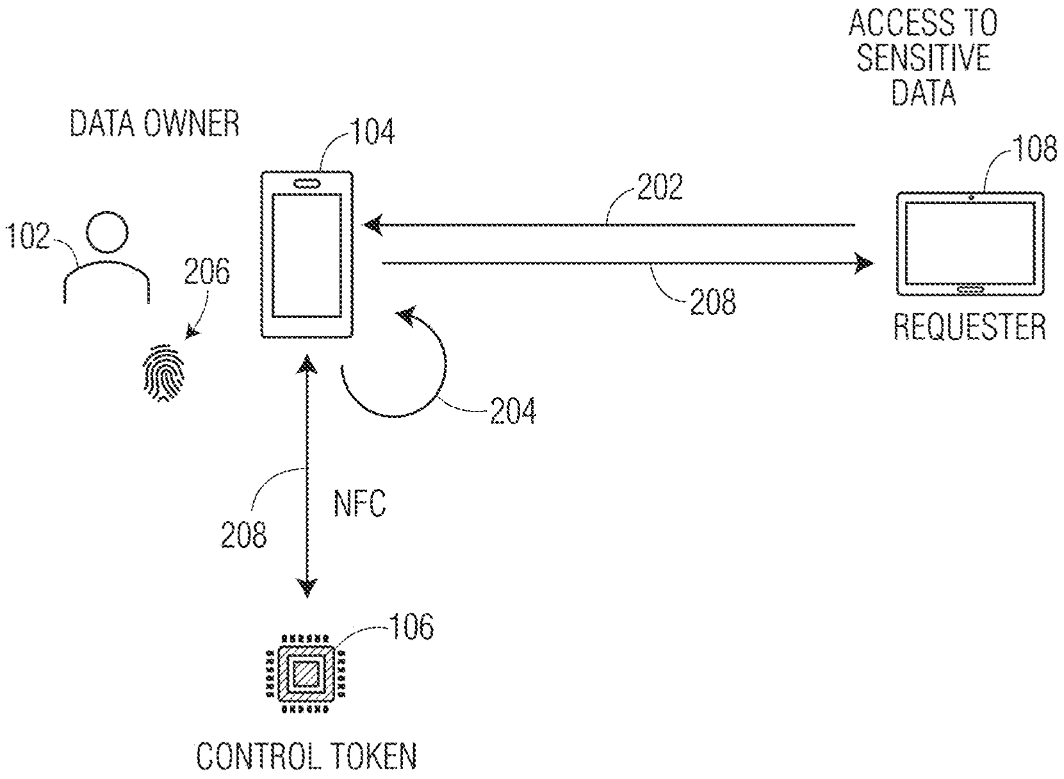
FIG. 2 illustrates the data flow during the use of the authentication system.

FIG. 2 illustrates the data flow during the use of the authentication system. First a requester 108 wants to access 202 the secure data stored in the user device 104. Then user device 104 receives a request for second factor authentication 204. Then the user 102 authenticates themself to the user device 104 using for example a biometric input 206. The user device 104 next requests the control token 106 as the second factor authentication via a communication protocol (e.g., NFC, UWB, Bluetooth, NFMI, etc.) 208. When the authentication using the second factor has been validated, the requester 108 obtains access to the data/service 208.

In the above steps, the case where the user 102 wants to access secure data and not a requester 108 is, for example, relevant when the user 102 (also the data owner in this case) wants to perform a qualified signature of a document. If the user device 102 is fully functional, the control token can be seen as a second factor authentication method but if the user device 102 is not fully functional (e.g., low battery), the use of the control token 106 is the authentication method.

There can be instances of this authentication system where the step 208 is performed only by a proximity check: i.e., the presence of the token in the vicinity of the device is enough to be considered as a successful authentication.

An example scenario where this method may be used includes is when someone (the user) wants to perform an electronic signature to sign documents requested by a verifier. The user authenticates using their EUDIW to access the service. As additional authentication trust, the user presents their control hardware token (ID documents, smartwatch, key ring, key fob, body implant, etc.) Authentication is complete and the user can perform their electronic signature.

The authentication system described above improves the security architecture of the EUDIW and keeps protection of user data under the control of the user.

When a phone has no battery, it is hard or not possible to get access to the secure data stored on the device that needs to be unlocked with a credential or biometric input. In other words, if, for example, there is a secure element with an NFC interface in the phone, it is still possible when battery low or when battery empty to access to the data in the secure element through its NFC interface. But the point is that for some data this retrieval operation is conditioned by an explicit biometric approval of the owner of the data (i.e., the owner of the device containing the secure element) and if the battery level is insufficient, the phone cannot perform the biometric authentication.

This embodiment of an authentication system implements the idea that if an owner's device has a low or empty battery (or equivalently, the battery is insufficient, which could include the inability to perform a biometric authentication), and if this device has an embedded secure element with NFC capabilities (this secure element contains the data to be unlocked), then the owner may trust another second device to be used as a biometric authenticator. The second device interacts with the first device through whichever radio and communication protocol is available and for which enough power is still available in the first device or through NFC. The biometric validation may be split between the second and first device and the embedded secure element in the first device according to the power available in the first device. The owner's device relays the biometric authentication to a second device that is trusted by the owner of the first device for this operation.

Another element of this authentication system is that the biometric unlocking in the second device may rely on the previous biometric unlocking operations already successfully performed on the first device before it entered the battery insufficient state. In other words, the embedded secure element in the first device also contains the necessary data from the previous successful biometric authentication that will be needed for the relayed biometric authentication on the second device.

As an additional security measure, the relayed biometric authentication can be locked by a second authentication factor through the interface of either the first device or the second device towards the secure element in the first device. As an additional security measure, the relayed biometric authentication can be put under the control of another embedded secure element located in the second device used as a biometric relay. In this case the split of the biometric operations can be among the two devices and the two embedded secure elements.

Figure 3:
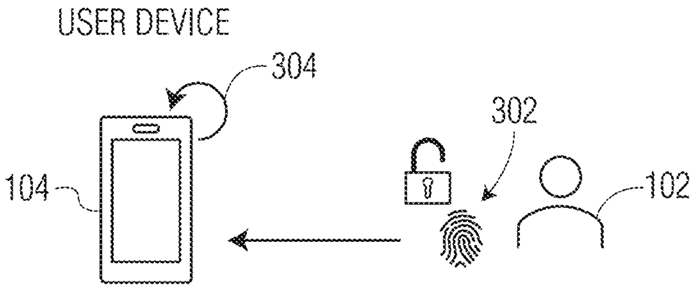
FIG. 3 illustrates the enrolment of biometric information for use with a second device as an external biometric authenticator.

FIG. 3 illustrates the enrolment of biometric information for use with a second device as an external biometric authenticator.

The user 102 unlocks their user device 104 and proceeds to a biometric enrollment on their secure element 302. The user device 104 saves the biometric token (fingerprints, face, iris, veins, etc.) into the secure element for an external verification 304. This process may be done in background at each strong authentication but also done during an enrolment/feature enablement. In case of enrolment or enablement of this mechanism an additional security level can be added (e.g., a specific pin code) to enable two factor authentication.

Figure 4:
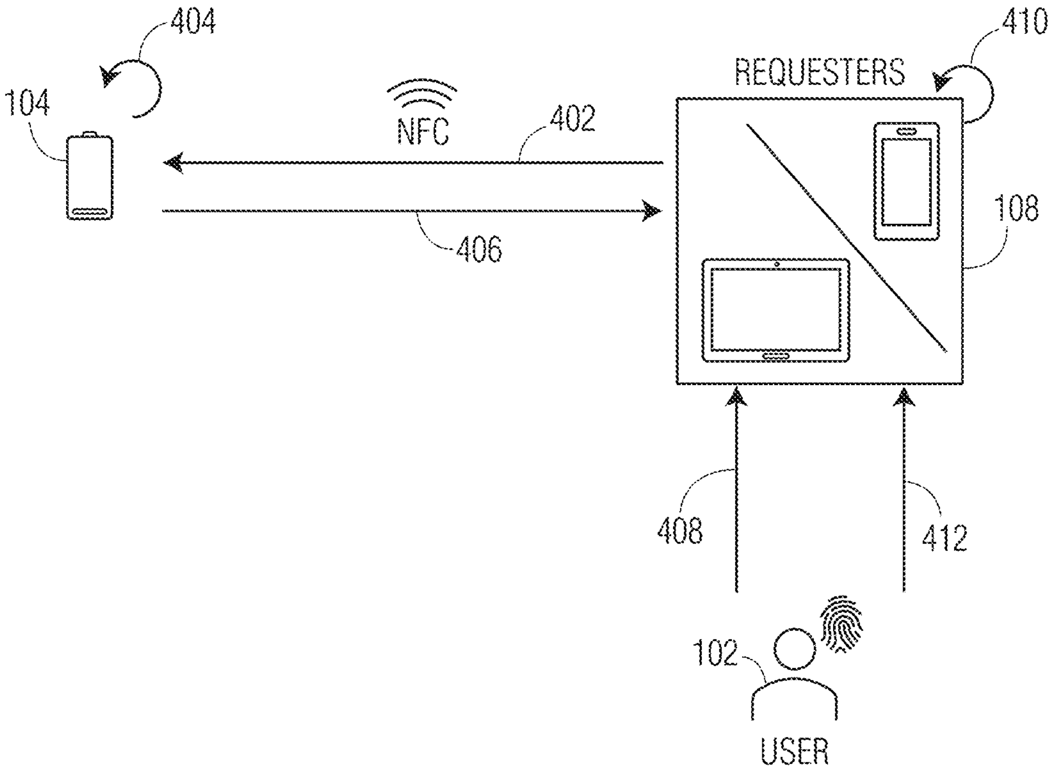
FIG. 4 illustrates a first case of an authentication system.

FIG. 4 illustrates a first embodiment of an authentication system. First, a requester 108 wants to access the secure data stored in the user device 104 that is without battery power or in a low power mode for verification using NFC communication 402. The user device 104 detects the NFC request and uses an NFC circuit to retrieve data from secure element 404. The user device 104 then sends a specific response 406 using NFC to the requester 108. This token response may include encrypted data, biometric data to be verified, timestamp, etc. User device's owner or user 102 uses the requesters device 108 to check their biometric data (face, fingerprint, etc.) 408. The biometric data received from the user 102 is compared to the biometric data included in the token response 410. If the data compared is validated, requesters 108 may access the secure encrypted data that has been received from the user device response. This may be done by decrypting the received encrypted secure data.

Optionally, in case of two factor authentication, the user 102 may be requested to use a pin code for to access to the data.

This process allows the user device 102 to use the requesters device 108 as a biometric authentication peripheral through the NFC interface. Please note that the second device and the verifier device can be the same or not.

Figure 5:
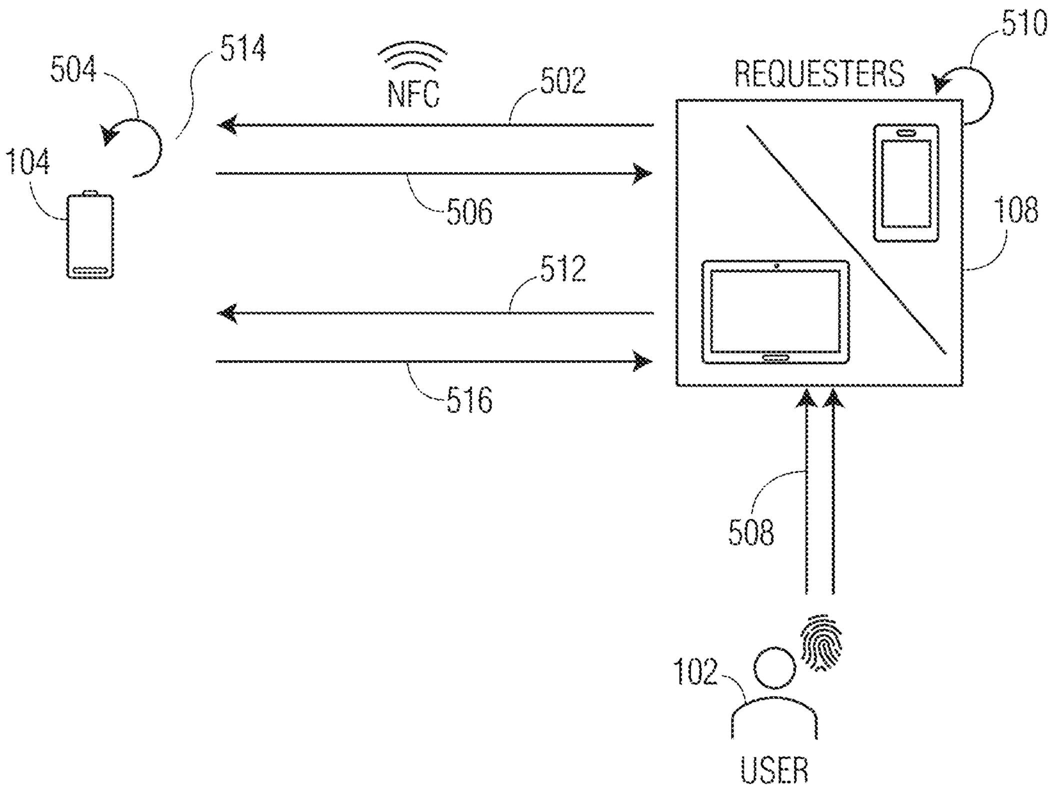
FIG. 5 illustrates a second case of an authentication system.

FIG. 5 illustrates a second embodiment of an authentication system. First, the requesters 108 want to access the secure data stored in the user device 104 which has no battery power or is in a lower power mode for verification using NFC communication 502. The user device 104 detects the NFC request and uses a NFC circuit to retrieve data from secure element 504. Next, the user device 104 sends a specific response using NFC to the requesters 506. This token response may include biometric data to be verified, timestamp, etc. Next, the user device's owner or user 102 uses the requesters device 108 to check their biometric data (e.g., face, fingerprint, iris, etc.) 508. Optionally, in case of two factor authentication, the user 102 may be requested to use a pin code for access to the data. The biometric data received from user 102 is compared to the biometric data included in the token response 510. If the data compared is validated, the requesters can access the secure encrypted data that has been received from the user device response. The user device 104 receives a request to prove that the user did a biometric verification 512. The user device 104 proves that the requester is allowed to access the sensitive data stored in the secure element of the user device 514. Then encrypted sensitive data is securely sent 516 to the requester 108. Please note that the second device and the verifier device can be the same or not.

An example scenario where this method may be used includes when a user 102 is subject to a control by an authority or the verifier 108. The user's mobile phone is low on battery, out of battery, or in some other low power mode and the sensitive data (i.e., an ID) requested by an authority needs high level authentication. The user 102 subject to the control has previously enabled the service in their device to access their ID stored in their secure element using biometric data from an external device. The verifier 108 receives a response from user's mobile device when the external device is tapped on the authority device. This request needs a strong authentication. The user does a biometric authentication on the authority device (eventually a two factor authentication is requested with a pin code) by using a biometric authentication on the external device. Finally, the authority can access the requested ID document which was stored in the user's device that is out of battery.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of accessing secure data on a user device, wherein authentication access of the user device is not available, comprising:
- receiving a request from a requester to access secure data in the user device;
- receiving an authentication input from a user;
- authenticating the authentication input from the user using a control token; and
- providing access to the secure data to the requester; and
- wherein the control token comprises:
  - a second factor for authenticating the authentication input when the user device is fully operational; and
  - a single factor for authenticating the request when the user device is not fully operational.

2. The method of claim 1, wherein the authentication input from the user includes a biometric input.

3. The method of claim 2, wherein the authentication input from the user also includes a secret user input code.

4. The method of claim 1, wherein authenticating the authentication input from the user using the control token uses near field communication.

5. The method of claim 1, wherein authenticating the authentication input from the user using the control token uses one of ultra-wideband communication, Bluetooth communication, and near field magnetic induction communication.

6. The method of claim 1, wherein providing access to secure data to the requester includes securely sending the requested secure data to the requester.

7. The method of claim 1, further comprising:
- receiving a request from the user to add the control token for each authentication;
- personalizing the control token; and
- binding the control token to the user device.

8. A method of accessing secure data on a user device by a requester device, wherein the user device is in a low power mode and is incapable of performing local biometric authentication, comprising:
- sending a request to the user device to access secure data in the user device;
- receiving data from the user device including biometric verification data retrieved from a secure element of the user device using power harvested from the requester device;
- receiving a biometric input from a verifier device, where a user provides a biometric input to the verifier device;
- comparing, by the requester device on behalf of the user device, the biometric input from the verifier device with the biometric verification data; and
- accessing the secure data of the user when an input from the verifier device matches the biometric verification data.

9. The method of claim 8, wherein the user also provides a secret user input code input to the verifier device.

10. The method of claim 8, wherein sending a request to the user device uses near field communication.

11. The method of claim 8, wherein sending a request to the user device uses one of ultra-wideband communication, Bluetooth communication, and near field magnetic induction communication.

12. The method of claim 8, wherein receiving data from the user device accessing the secure data includes:
- receiving data from the user device includes receiving encrypted secure data from the user device; and
- accessing the secure data includes decrypting the encrypted secure data when an input from the verifier device matches the biometric verification data.

13. The method of claim 8, further comprising:
- sending proof to the user device that the user performed a biometric verification; and
- receiving encrypted secure data from the user device when the user device verifies the proof that the user performed a biometric verification.

14. A method of accessing secure data on a user device by a requester device, wherein the user device is in a low power mode and is incapable of performing local biometric authentication, comprising:
- receiving a request from the requester device to access secure data in the user device;
- sending data to the requester device including biometric verification data retrieved from a secure element of the user device using power harvested from the requester device;
- receiving proof of a biometric input into a verifier device from the requester device, where the user provides a biometric input to the verifier device;
- verifying the proof of a biometric input; and
- sending the secure data of the user to the requester device when the proof of a biometric input is verified.

15. The method of claim 14, wherein receiving proof of the biometric input from the verifier device includes receiving proof that the user input a secret user input code into the verifier device.

16. The method of claim 14, wherein receiving the request from the requester device uses near field communication.

17. The method of claim 14, wherein receiving the request from the requester device uses one of ultra-wideband communication, Bluetooth communication, and near field magnetic induction communication.

18. The method of claim 14, further comprising encrypting the secure data before sending the secure data to the requester device.

* * * * *